UNITED STATES PATENT OFFICE.

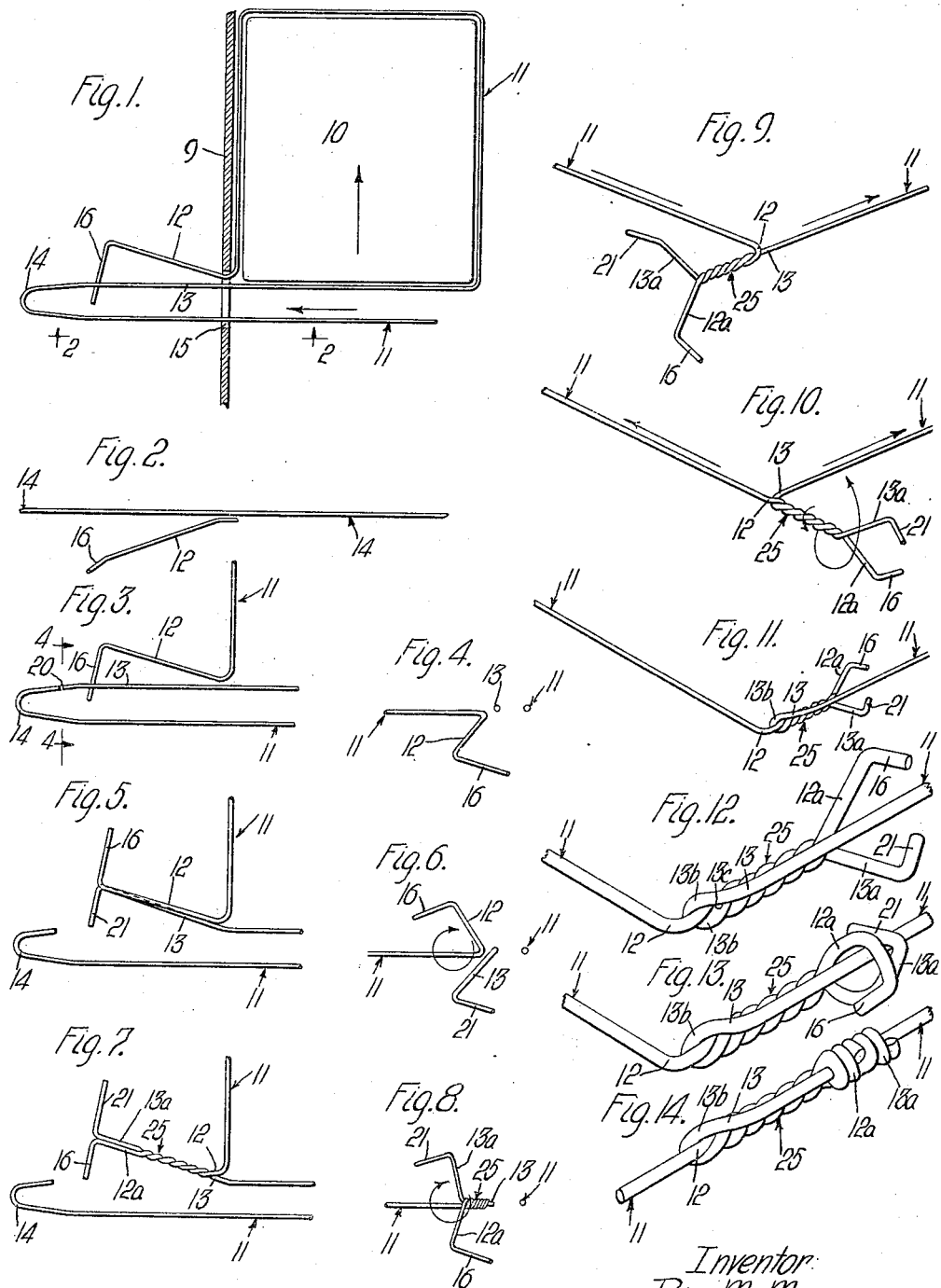

ROY M. MOWRY, OF LOS ANGELES, CALIFORNIA, ASSIGNOR TO MOWRY MACHINERY MANUFACTURING COMPANY, OF LOS ANGELES, CALIFORNIA, A CORPORATION OF CALIFORNIA.

WIRE-TIE AND METHOD OF MAKING SAME.

1,272,502.   Specification of Letters Patent.   Patented July 16, 1918.

Application filed October 16, 1916. Serial No. 125,802.

*To all whom it may concern:*

Be it known that I, ROY M. MOWRY, a citizen of the United States, residing at Los Angeles, in the county of Los Angeles, State of California, have invented new and useful Improvements in Wire-Ties and Methods of Making Same, of which the following is a specification.

This invention relates to a wire tie and a method of forming the same, such as shown and described in my Patent No. 1,180,935, dated April 25, 1916. This application is directed specifically to a wire tie of the character described as the tie made by the mechanism of said patent, and to the method of making such a tie.

It is a primary object of this invention to provide a tie, and a method of making the same, simple, strong, and effective in character; and, furthermore, to make a tie which is particularly effective as a tie for wires surrounding a bale or the like.

The nature of this invention will be best understood from the following detailed description of a preferred form of tie and a preferred method of making said tie; reference being had to the accompanying drawings, in which, Figure 1 is a plan showing the disposition of the wire at the beginning of the operation of making the tie; Fig. 2 is a side elevation taken as indicated by line 2—2 on Fig. 1, showing the disposition of the wire; Figs. 3 and 4, Figs. 5 and 6, Figs. 7 and 8, are, respectively, plans and elevations showing the dispositions of the wires in succeeding steps of the method, Figs. 4, 6 and 8 being end elevations taken in the direction indicated generally by line 4—4 on Fig. 3; Fig. 9 is a perspective illustrating the disposition of the wires of the tie when the tie reaches the phase shown in Figs. 7 and 8; Fig. 10 is a similar perspective showing the succeeding disposition of the wires; Fig. 11 is a similar perspective showing a finished tie; Fig. 12 is an enlarged perspective showing a finished tie; Fig. 13 is a similar enlarged perspective showing another form of finished tie; and Fig. 14 is a similar perspective showing another form of finished tie.

In Fig. 1 I have illustrated a bale or any other similar article at 10; and I show the wire 11 encircling the bale with its two ends 12 and 13 disposed in the relative positions shown. In a baling machine the bale 10 is formed in any appropriate manner and is moved in the direction indicated during its formation; and when the bale is completely formed, then the wire is moved transversely across the rear end of the bale, in the direction indicated by the arrow pointing to the left in Fig. 1, in the form of a loop 14. The end 12 of the wire, and the loop 14, including the part 13, project through an opening 15 in the plate or wall 9 of the baling compartment. In the machine, the parts 12 and 13 are engaged by a twister head, for twisting the ends together; but, so far as the method or the finished tie is generally concerned, it is immaterial whether such a twister head is used or not. The terminal of the wire, at the end of portion 12, is bent at an angle as shown at 16; and the portion 12 may extend out, substantially parallel to the portion 13, or at a slight angle thereto, as is shown in the various views. The next operation, in the specific method herein described, is the cutting of the loop 14 at the point 20, shown in Fig. 3. This leaves the portion 13 free to be twisted with the portion 12. During the next operation the end of portion 13 is bent at an angle, as shown at 21; and the twisting of the portions 12 and 13 is begun by rotation in the direction indicated by the arrow in Fig. 6; the portion 12 being carried first up and around to the position shown in Fig. 6, while the portion 13 is carried down and around toward the position shown in Fig. 6. Further rotation and twisting of the two wires is carried on by rotation in the direction indicated, until the two portions 12 and 13 are twisted together to form the twist shown at 25; and the two end portions 12$^a$ and 13$^a$ are left projecting beyond the outer end of the twist in substantially the relative positions shown in Figs. 7, 8 and 9.

In a baling machine the bale 10 is then moved onward in the direction indicated in Fig. 1; and the result of this action is to pull the twist through the opening 15 and to straighten it around to the position shown in Fig. 10; but this straightening around may be done by hand or in any other manner suitable. When the bale emerges from the machine; that is, when compression is taken off the bale; the bale expands and puts a tension upon the wire 11, tending to pull upon the wire portions 12 and 13 in the directions indicated by the straight arrows in Fig. 10. Now this pull upon these wire portions has a tendency to somewhat untwist the twist 25 (rotating the twist indicated in the direction indicated by the small curved arrow in Fig. 10), and also has a tendency to pull the whole twist around in the direction indicated by the larger curved arrow in Fig. 10, and to pull the whole twist around toward the position shown in Fig. 11; having, perhaps, untwisted the twist to the extent of one half a turn or so in forcing it to this position. Now, in some instances, the tension on the wire may not move the twist to the position shown in Fig. 11; and the twist may be put into this position by hand or by any other suitable means. In the position shown in Fig. 11, the protruding free ends 12$^a$ and 13$^a$, and the bent parts 16 and 21, lie under the wire 11, as does also the twist 25. The twist 25 lies back parallel to and under the wire 11, as shown in Fig. 11; and the wire portion 13 has taken a loop formation, as shown at 13$^b$. The disposition of the wires is more clearly shown in the enlarged view of Fig. 12. It will be seen that a loop is formed at 13$^b$, the wire portion 13 passing around the wire portion 12 in a complete loop, completely encircling the wire portion 12 and crossing back upon itself at the point denoted 13$^c$ in Fig. 12. It is this loop which gives especial strength to my tie. In the position shown in Fig. 12 the parts 12$^a$ and 13$^a$ project on opposite sides of the wire 11. When the tie is used as a tie for a bale, the twist 25 and the parts 12$^a$ and 13$^a$ bear back against the bale. In fact, it is the bearing of the twist and of the parts 12$^a$ and 13$^a$ with the bale, and the formation of loop 13$^b$, which stops further movement of the twist in the direction indicated in Fig. 10.

The form shown in Fig. 12 is a complete tie for certain purposes, and is sufficiently effective for hay bales and the like. But for additional security the parts 12$^a$ and 13$^a$ may be bent around the wire 11, as shown in Fig. 13, thus effectually preventing any movement of the twist 25 from the position shown, and effectually preserving the loop at 13$^b$.

My wire tie is not limited to ties for bales and the like, and may be used as a general tie for wire ends. Thus, in Fig. 14, I show the wire ends approaching each other on a straight line rather than around the corner of a bale; and in this case, or any other case for that matter, the parts 12$^a$ and 13$^a$ may be tightly twisted around the wire 11 along which the twist 25 lies.

In actual test I have found that the average breaking strain of my tie (either in the form shown in Fig. 12 applied to a bale, or in the other forms shown) is equal to about 95% of the breaking strength of the wire itself. An it will thus be seen that I have provided a simple form of wire tie, made in a simple manner, practically as strong as the wire itself.

Having described a preferred form of my invention, I claim:

1. As an article of manufacture, the herein described tie for two wire ends, comprising substantially a twist which embodies the two wire ends directly twisted together with both wire terminals at the same end of the twist, the two wires extending oppositely away from the twist, said twist extending from the point of entry of the wires into the twist back alongside one of the wires, so that said wire where it enters the twist makes a loop around the other wire where it enters the twist.

2. As an article of manufacture, the herein described tie for two wire ends, comprising substantially a twist which embodies the two wire ends directly twisted together with both wire terminals at the same end of the twist, the two wires extending oppositely away from the twist, the two wires extending from the point of entry of the wires into the twist back alongside one of the wires, so that said wire where it enters the twist makes a loop around the other wire where it enters the twist, the terminal wire ends at the end of the twist being bent around the said wire along which the twist lies.

3. The herein described method of making a wire tie, embodying placing the two wire ends in substantially parallel relation ready to be twisted together and bending their terminal ends at an angle, twisting the wire ends directly together with both terminal ends at the same end of the twist, and then applying tension oppositely to the two wires entering the twist greater than the tension under which the twist was formed and thus putting strain on the twist, as and for the purposes described.

4. The herein described method of making a wire tie, embodying placing two wire ends in substantially parallel relation ready to be twisted together and bending their terminal ends at an angle, twisting the wire ends directly together with both terminal ends at the same end of the twist, then applying tension oppositely to the two wires entering the twist greater than the tension under which the twist was formed and thus putting strain on the twist, thus bending the twist to a position extending out on opposite sides of that wire, as and for the purpose described.

5. The herein described method of making a wire tie, embodying two wire ends in substantially parallel relation and twisting the wire ends directly together with both terminals at the same end of the twist, and then applying tension oppositely to the two wires entering the twist greater than the tension under which the twist was formed, as and for the purposes described.

In witness that I claim the foregoing I have hereunto subscribed my name this 11th day of October, 1916.

ROY M. MOWRY.

Witness:
JAMES T. BARKELEW.

Copies of this patent may be obtained for five cents each, by addressing the "Commissioner of Patents, Washington, D. C."